United States Patent
Minagawa

(10) Patent No.: US 7,655,207 B2
(45) Date of Patent: Feb. 2, 2010

(54) ALUMINUM COMPLEX HYDROXIDE SALT AND METHOD OF PRODUCING THE SAME

(75) Inventor: Madoka Minagawa, Chuo-ku (JP)

(73) Assignee: Mizusawa Chemicals, Ltd. (JP)

( * ) Notice: Subject to any disclaimer, the term of this patent is extended or adjusted under 35 U.S.C. 154(b) by 0 days.

(21) Appl. No.: 12/226,470

(22) PCT Filed: Apr. 19, 2007

(86) PCT No.: PCT/JP2007/059003

§ 371 (c)(1),
(2), (4) Date: Oct. 20, 2008

(87) PCT Pub. No.: WO2007/123264

PCT Pub. Date: Nov. 1, 2007

(65) Prior Publication Data

US 2009/0110625 A1      Apr. 30, 2009

(30) Foreign Application Priority Data

Apr. 20, 2006 (JP) .............................. 2006-117092

(51) Int. Cl.
 *C01B 33/20* (2006.01)
 *C01C 1/00* (2006.01)
(52) U.S. Cl. .............. 423/328.2; 423/328.1; 423/329.1; 423/331; 423/332; 423/335
(58) Field of Classification Search ... 423/328.1–330.1, 423/600, 518, 594.15, 594.16
See application file for complete search history.

(56) References Cited

U.S. PATENT DOCUMENTS

| | | | | |
|---|---|---|---|---|
| 3,692,700 A | * | 9/1972 | Sawyer et al. | ............... 502/251 |
| 3,729,429 A | * | 4/1973 | Robson | ...................... 502/251 |
| 3,855,147 A | * | 12/1974 | Granquist | ................... 516/110 |
| 3,959,444 A | * | 5/1976 | Yokoi et al. | .............. 423/330.1 |
| 5,077,248 A | * | 12/1991 | Ogawa et al. | ............... 501/141 |
| 5,595,716 A | * | 1/1997 | Torii et al. | ............... 423/328.2 |
| 5,767,179 A | * | 6/1998 | Takado | ...................... 524/103 |
| 5,958,354 A | * | 9/1999 | Thompson et al. | ....... 423/328.1 |
| 6,077,342 A | * | 6/2000 | Ishii et al. | ...................... 117/1 |
| 6,090,734 A | * | 7/2000 | Tsipursky et al. | ........... 501/141 |
| 6,306,494 B1 | * | 10/2001 | Takahashi et al. | ........... 428/328 |
| 6,418,661 B1 | * | 7/2002 | Takahashi et al. | ................ 47/9 |
| 6,468,500 B1 | * | 10/2002 | Sakaguchi et al. | .......... 423/700 |
| 6,544,631 B1 | * | 4/2003 | Tanaka et al. | ............. 428/195.1 |
| 6,706,249 B1 | * | 3/2004 | Komatsu et al. | ............. 423/518 |
| 6,835,320 B1 | * | 12/2004 | Komatsu et al. | ............... 252/62 |
| 7,097,818 B2 | * | 8/2006 | Lindner et al. | .............. 423/326 |
| 7,125,532 B2 | * | 10/2006 | Brasch et al. | ............. 423/328.1 |
| 7,128,892 B2 | * | 10/2006 | Pinnavaia et al. | ........... 423/700 |
| 2005/0074397 A1 | * | 4/2005 | Pinnavaia et al. | ........... 423/705 |
| 2006/0147367 A1 | * | 7/2006 | Temperly et al. | ............ 423/331 |

* cited by examiner

*Primary Examiner*—Stuart Hendrickson
*Assistant Examiner*—Richard M Rump
(74) *Attorney, Agent, or Firm*—H. Jay Spiegel

(57) ABSTRACT

An aluminum complex hydroxide salt having Al oxide octahedral layers and a divalent anion among the octahedral layers, wherein an aluminosilicate anion expressed by the following general formula (1), $$[Na_pAl_qSi_rO_z]^{2-} \quad (1)$$

wherein p, q, r and z are positive numbers satisfying,
$5 \leq z \leq 20$,
$z = (p/2) + (3q/2) + 2r + 1$,
$0 < p/q < 1$,
$0.01 \leq q/r \leq 1$ is, at least, contained as the divalent anion. The aluminum complex hydroxide salt can be favorably used as a compounding agent for resins, and exhibits excellent heat retaining property as well as excellent transparency particularly when it is mixed as a heat retaining agent into films for agricultural use.

13 Claims, 5 Drawing Sheets

ALUMINUM COMPLEX HYDROXIDE SALT AND METHOD OF PRODUCING THE SAME

TECHNICAL FIELD

This invention relates to a novel aluminum complex hydroxide salt and to a method of producing the same. More specifically, the invention relates to a novel aluminum complex hydroxide salt that can be preferably used as a resin compounding agent that is mixed as a heat retaining agent into films for agricultural use and the like, and to a method of producing the same.

BACKGROUND ART

Lithium aluminum complex hydroxide salts expressed by the following formula, $$[Al_2Li(OH)_6]_2 \cdot A \cdot mH_2O$$

wherein A is a divalent anion, have heretofore been known, and those in which the divalent anion A is a carbonate anion ($CO_3^{2-}$) or a silicate anion ($Si_3O_7^{2-}$) have been used being mixed as heat retaining agents into the films for agricultural use (see patent documents 1 and 2).

Patent document 1: JP-A-7-286052
Patent document 2: Japanese Patent No. 2852563

DISCLOSURE OF THE INVENTION

When mixed into the resin films, however, the conventional lithium aluminum complex hydroxide salts exhibit heat retaining property of a level that satisfies the requirement of films for agricultural use but still leave room for improvement from the standpoint of their low transparency. As demonstrated by Comparative Examples appearing later, for example, an ethylene/vinyl acetate copolymer film (100 μm thick) blended with the lithium aluminum complex hydroxide salt in an amount of 10% by weight has a haze of about 17% when it is of the carbonate anionic type (Comparative Example 1) and a haze of about 13% when it is of the silicate anionic type (Comparative Example 4).

It is, therefore, an object of the present invention to provide a novel aluminum complex hydroxide salt which can be favorably used as a compounding agent for resins and which, when mixed as a heat retaining agent into films for agricultural use, exhibits particularly excellent heat retaining property and excellent transparency, and a method of producing the same.

According to the present invention, there is provided an aluminum complex hydroxide salt having Al oxide octahedral layers and a divalent anion among the octahedral layers, wherein an aluminosilicate anion expressed by the following general formula (1), $$[Na_pAl_qSi_rO_z]^{2-} \quad (1)$$

wherein p, q, r and z are positive numbers satisfying,
$5 \leq z \leq 20$,
$z = (p/2) + (3q/2) + 2r + 1$,
$0 < p/q < 1$,
$0.01 \leq q/r \leq 1$ is, at least, contained as the divalent anion.

In the aluminum complex hydroxide salt of the invention, an Al atom in the aluminosilicate anion appears as a peak of Al of 4-coordination in a range of chemical shift of from +80 ppm to +50 ppm and an Al atom in the Al hydroxide octahedral layers appears as a peak of Al of 6-coordination in a range of chemical shift of from +20 ppm to −20 ppm as measured by $^{27}$Al-solid NMR.

It is, further, desired that the aluminosilicate anions are present at a ratio of not less than 25 mol % of the divalent anions among the layers.

Further, $SO_4^{2-}$ and/or $CO_3^{2-}$ may also be present as the divalent anions among the layers.

The aluminum complex hydroxide salts of the present invention include those of the type of the gibbsite structure and those of the hydrotalcite type depending upon the form of the Al hydroxide octahedral layers.

The Al complex hydroxide salt of the type of the gibbsite structure is such that the Al hydroxide octahedral layers have at least either one kind of atom selected from a Li atom and a Mg atom introduced into a vacant site of the gibbsite-type aluminum hydroxide, and is expressed by the following general formula (2), $$[Al_2Li_{(1-x)}Mg_x(OH)_6]_2^{2(1+x)+} \cdot A^{2-}{}_{1+x} \cdot mH_2O \quad (2)$$

wherein $A^{2-}$ is the divalent anion among the layers,
x is a number satisfying $0 \leq x < 1$, and m is zero or a positive integer.

Of the Al complex hydroxide salts of the gibbsite structure, the one having the Al hydroxide octahedral layers in which the Li atom is introduced into a vacant site of the gibbsite-type aluminum hydroxide but no Mg atom is introduced therein, is expressed by the following general formula (2a), $$[Al_2Li(OH)_6]_2^{2+} \cdot A^{2-} \cdot mH_2O \quad (2a)$$

wherein $A^{2-}$ is the divalent anion among the layers, and
m is zero or a positive integer.

Further, the Al complex hydroxide salt of the hydrotalcite structure is such that the Al hydroxide octahedral layers have the hydrotalcite structure in which part of Mg in the brucite structure is isomorphously substituted by Al. The aluminum complex hydroxide salt of the above structure is expressed by the following general formula (3), $$[Al_xMg_{3-x}(OH)_6]^{x+} \cdot A^{2-}{}_{x/2} \cdot mH_2O \quad (3)$$

wherein $A^{2-}$ is the divalent anion among the layers,
x is a number satisfying $0.6 \leq x \leq 1.5$, and m is zero or a positive integer.

Of the aluminum complex hydroxide salts having the gibbsite structure of the invention, the one having a structure in which the Li atom only is introduced into a vacant site of the gibbsite type aluminum hydroxide, i.e., the one expressed by the above general formula (2a), is produced by following steps of;

reacting an aluminum hydroxide with a lithium carbonate in the presence of an aqueous medium to form a lithium aluminum complex hydroxide carbonate expressed by the following formula (4a), $$[Al_2Li(OH)_6]_2^{2+} \cdot (CO_3)^{2-} \cdot mH_2O \quad (4a)$$

wherein m is zero or a positive integer, treating the lithium aluminum complex hydroxide carbonate with a mineral acid to substitute the carbonic acid radical by the mineral acid anion, and reacting the obtained substituted product with silicic acid soda and aluminic acid soda to further substitute the mineral acid anion by an aluminosilicate anion expressed by the above formula (1).

Further, of the Al complex hydroxide salts having the gibbsite structure, the one having a structure in which the Li atom and the Mg atom are introduced into vacant sites of the gibbsite type aluminum hydroxide, i.e., the one in which $x \neq 0$ in the above general formula (2), is produced by following steps of;

reacting an aluminum hydroxide, a lithium carbonate and a basic magnesium carbonate in the presence of an aqueous medium to form a lithium magnesium aluminum complex hydroxide carbonate expressed by the following formula (4b),

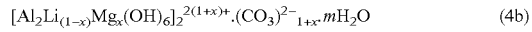

$$[Al_2Li_{(1-x)}Mg_x(OH)_6]_2^{2(1+x)+}.(CO_3)^{2-}{}_{1+x}.mH_2O \qquad (4b)$$

wherein x is a number satisfying $0 < x < 1$, and m is zero or a positive integer, treating the lithium magnesium aluminum complex hydroxide carbonate with a mineral acid to substitute the carbonic acid radical by the mineral acid anion, and reacting the obtained substituted product with silicic acid soda and aluminic acid soda to further substitute the mineral acid anion by an aluminosilicate anion expressed by the following formula (1).

In producing the Al complex hydroxide salt having the gibbsite structure as described above, it is desired to use the sulfuric acid as the mineral acid.

In the present invention, further, the one in which the Al hydroxide octahedral layers have the hydrotalcite structure, i.e., the Al complex hydroxide salt expressed by the above formula (3), is produced by following steps of;

preparing a magnesium aluminum complex hydroxide sulfate expressed by the following formula (5),

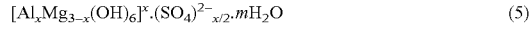

$$[Al_xMg_{3-x}(OH)_6]^x.(SO_4)^{2-}{}_{x/2}.mH_2O \qquad (5)$$

wherein x is a number satisfying $0.6 \leq x \leq 1.5$, and m is zero or a positive integer, reacting the magnesium aluminum complex hydroxide sulfate with silicic acid soda and aluminic acid soda, and substituting the sulfate anion in the formula (5) by the aluminosilicate anion expressed by the above formula (1).

In order to compensate for the electric charge in the Al hydroxide octahedral layers, the Al complex hydroxide salt of the present invention has a structure in which a divalent anion is incorporated among the octahedral layers. It is therefore important that at least an aluminosilicate anion expressed by the following general formula (1),

$$[Na_pAl_qSi_rO_z]^{2-} \qquad (1)$$

wherein p, q, r and z are positive numbers satisfying,
$5 \leq z \leq 20$,
$z = (p/2) + (3q/2) + 2r + 1$,
$0 < p/q < 1$,
$0.01 \leq q/r \leq 1$ is contained as the divalent anion.

That is, in the conventional known carbonate type aluminum complex hydroxide salt, the carbonate anion ($CO_3^{2-}$) enters into among the layers and in the conventional known silicate anionic aluminum complex hydroxide salt, the silicate anion ($Si_3O_7^{2-}$) enters into among the layers. In the Al complex hydroxide salt of the present invention, on the other hand, the aluminosilicate anion is entering therein. Due to the presence of the aluminosilicate anion, the Al complex hydroxide salt of the present invention exhibits excellent heat retaining property when it is mixed into the resin and helps maintain excellent transparency. For example, as will become obvious from Examples described later, the ethylene/vinyl acetate copolymer film blended with the Al complex hydroxide salt of the present invention exhibits a haze of less than 6%, which is a very high transparency as compared to those of the carbonate type aluminum complex hydroxide salt or the silicate anionic aluminum complex hydroxide salt.

Therefore, the Al complex hydroxide salt of the present invention is very useful as a compounding agent for resins and, particularly, as a heat retaining agent mixed into films for agricultural use.

BEST MODE FOR CARRYING OUT THE INVENTION

Figure 1:
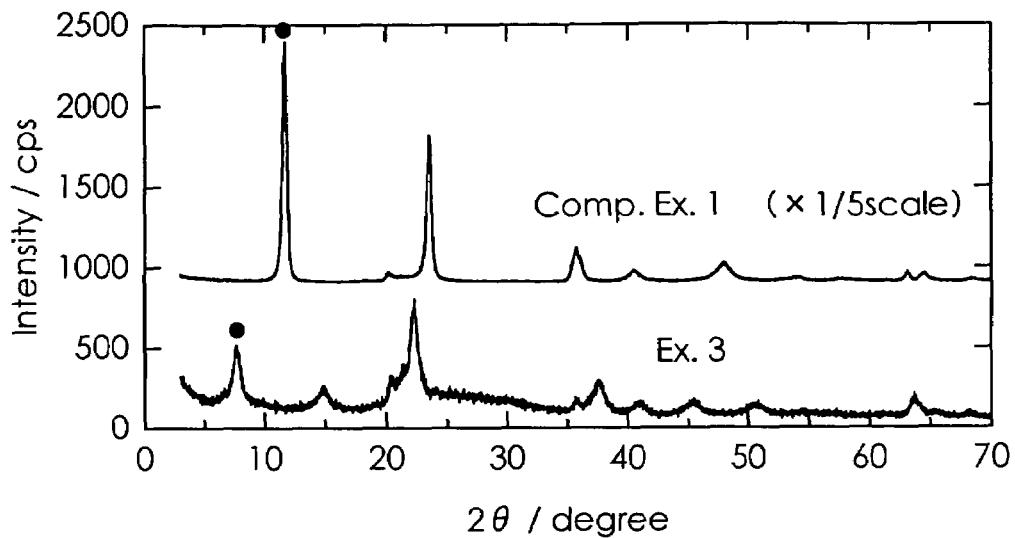
FIG. 1 is an X-ray diffraction diagram of a carbonate anionic LAHS (Comparative Example) and an aluminosilicate anionic LAHS (Example 3) of the present invention.

As described already, the Al complex hydroxide salts of the invention have a divalent anion among the Al hydroxide octahedral layers, and include those of the gibbsite type in which the Al hydroxide octahedral layers have a structure where at least one kind of atom selected from a Li atom and a Mg atom is introduced into a vacant site of the gibbsite-type aluminum hydroxide, and those of the hydrotalcite type in which the Al hydroxide octahedral layers have a hydrotalcite structure where part of Mg of the brucite structure is isomorphously substituted by Al.

In the present invention, the gibbsite-type aluminum complex hydroxide salt (hereinafter called G-LAHS) is expressed by the general formula (2),

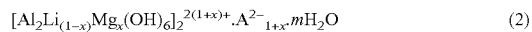

$$[Al_2Li_{(1-x)}Mg_x(OH)_6]_2^{2(1+x)+}.A^{2-}{}_{1+x}.mH_2O \qquad (2)$$

wherein $A^{2-}$ is the divalent anion among the layers,
x is a number satisfying $0 \leq x < 1$, and m is zero or a positive integer.

In particular, those in which $x=0$ in the general formula (2) are expressed by the following formula (2a),

$$[Al_2Li(OH)_6]_2^{2+}.A^{2-}.mH_2O \qquad (2a)$$

In the present invention, on the other hand, the hydrotalcite type aluminum complex hydroxide salt (hereinafter called HT-AHS) is expressed by the following general formula (3),

$$[Al_xMg_{3-x}(OH)_6]^x.A^{2-}{}_{x/2}.mH_2O \qquad (3)$$

wherein $A^{2-}$ is the divalent anion among the layers,
x is a number satisfying $0.6 \leq x \leq 1.5$, and m is zero or a positive integer.

That is, in the present invention, the Al complex hydroxide salt of either type of the general formula (2) or (3) contains the aluminosilicate anion expressed by the following general formula (1), $$[Na_p Al_q Si_r O_z]^{2-} \quad (1)$$

wherein p, q, r and z are positive numbers satisfying,
$5 \leq z \leq 20$,
$z = (p/2) + (3q/2) + 2r + 1$,
$0 < p/q < 1$,
$0.01 \leq q/r \leq 1$ as the divalent anion among the layers. Due to the presence of the aluminosilicate anion, the resin blended therewith exhibits excellent transparency. Further, as will become obvious from the IR analysis that will be described later, the above aluminum complex hydroxide salt of the invention exhibits many absorption peaks offering excellent heat retaining property, and can be very favorably used as a heat retaining agent, particularly, for films for agricultural use.

In the thus obtained aluminum complex hydroxide salt of the invention, the aluminosilicate anions of the above general formula (1) present among the layers can be confirmed from the facts described below.

First, the $^{27}$Al solid MAS-NMR measurement and the $^{29}$Si solid MAS-NMR measurement make it possible to confirm the presence of Al of 6-coordination, Al of 4-coordination and Si of 4-coordination. That is, the presence of Al of 6-coordination suggests the presence of the aluminum hydroxide octahedral basic layer of the gibbsite structure or the brucite structure, and the presence of Si of 4-coordination suggests the presence of the tetrahedral layer of silica. Further, the presence of Al of 4-coordination tells that Al is isomorphously substituted by Si in the tetrahedral layer. For example, as will become obvious from Examples appearing later, the Al atom in the aluminosilicate anion appears as a peak of Al of 4-coordination in a range of chemical shift of from +80 ppm to +50 ppm through the $^{27}$Al-solid NMR measurement, and the Al atom in the Al hydroxide octahedral layer appears as a peak of Al of 6-coordination in a range of chemical shift of from +20 ppm to −20 ppm (see FIG. 6). From the X-ray diffraction peaks, further, the gap among the layers is expanding due to the expansion of the plane [001], from which it is learned that the tetrahedral layer in which Si is partly isomorphously substituted by Al is introduced among the octahedral basic layers (see FIG. 1).

Here, the elemental analysis indicates that Li and Na are present together with Al, Si and O in the aluminum complex hydroxide salt of the gibbsite structure (G-LAHS). Among them, Li is present at a vacant site in the aluminum hydroxide octahedral basic layers, but Na has a large atomic size and cannot enter into the vacant site. It is, therefore, considered that Na is introduced in a form of compensating for a balance of electric charge at the time when Si in the tetrahedral layer is partly isomorphously substituted by Al.

It will, therefore, be learned that the aluminosilicate anion is expressed by the above formula (1) and is present among the layers.

In the formula (1) showing the aluminosilicate anion, a value q/r representing an Al/Si ratio is determined by a quantity ratio of the aluminic acid soda and the silicic acid soda used at the time of introducing the anions. If this value is smaller than 0.01, the obtained aluminum complex hydroxide salt exhibits properties close to those of the silicate anionic LAHS and when mixed, for example, into a resin, it becomes difficult to maintain excellent transparency. Further, if the value q/r is larger than 1, it becomes necessary to use aluminic acid soda in large amounts making it difficult to exchange anions like when the aluminic acid soda is used alone. After all, it cannot be synthesized (i.e., in the invention, it is essential that the aluminic acid soda and the silicic acid soda are used at such a ratio of amounts that the value q/r is in a range of 0.01 to 1).

In the present invention, the aluminosilicate anion of the formula (1) is introduced by the substitution by the sulfate anion. Further, the sulfate anion is often introduced by the substitution by the carbonate anion. As the divalent anion among the layers, the carbonate anion is most stable and is often introduced upon absorbing the carbonic acid gas in the air. That is, as the divalent anion ($A^{2-}$) in the formula (2) or (3), the sulfate anion or the carbonate anion is often present together with the aluminosilicate anion. Therefore, the divalent anion ($A^{2-}$) in the formulas (2) and (3) can be expressed by the following formula, $$[Q]_a \cdot [SO_4^{2-}]_b \cdot [CO_3^{2-}]_c$$

wherein Q is an aluminosilicate anion expressed by the above formula (1).

In the present invention, it is desired that the aluminosilicate anions are present in an amount of not less than 25 mol %, particularly, not less than 50 mol % and, most desirably, not less than 60 mol % in the anions ($A^{2-}$) (i.e., a/A, (A=a+b+c), is not less than 0.25, desirably, not less than 0.5 and, most desirably, not less than 0.6). If the aluminosilicate anions are substituted in small amounts, the resin blended therewith loses transparency, exhibits increased hygroscopic property and becomes not suited for use as a compounding agent for resins. Therefore, the aluminosilicate anions are substituted so as to achieve the above amount of substitution.

The value m representing the amount of water content in the formulas (2) and (3) is, usually, not larger than 5, which, however, can be decreased to zero by heat-treating the aluminum complex hydroxide salt obtained by a method described later at about 200° C.

The above-mentioned aluminum complex hydroxide salt of the invention is basically produced by preparing a precursor salt having an anion (usually, a sulfate anion) among the Al hydroxide octahedral layers and substituting the anion in the precursor salt by the above-mentioned aluminosilicate anion.

Described below are the production methods, i.e., a method of producing the gibbsite type aluminum complex hydroxide salt (G-LAHS) and a method of producing the hydrotalcite type aluminum complex hydroxide salt (HT-AHS).

<Production of G-LAHS>

In the present invention, the gibbsite type aluminum complex hydroxide salt (G-LAHS) is produced by, first, reacting an aluminum hydroxide with a lithium carbonate to prepare an aluminum complex hydroxide carbonate, substituting the carbonate anion in the carbonate by a mineral acid anion and, further, substituting the mineral acid anion by an aluminosilicate anion.

(1) Production of Aluminum Complex Hydroxide Carbonates:

To produce the carbonate, the aluminum hydroxide is reacted with the lithium-carbonate in an aqueous medium. Concretely, the lithium carbonate is added to an aqueous slurry of the aluminum hydroxide, and whereby a lithium aluminum complex hydroxide carbonate (carbonate anionic LAHS) expressed by the following formula (4a), $$[Al_2 Li(OH)_6]_2^{2+} \cdot (CO_3)^{2-} \cdot mH_2O \quad (4a)$$

wherein m is zero or a positive integer, is obtained.

In the above reaction, it is desired that the aluminum hydroxide that is used has been adjusted for its grain size to assume the form of fine particles. For example, the aluminum hydroxide and water are mixed together, wet-pulverized by using a ball mill or the like mill so as to possess a volume average particle size $D_{50}$ (by a laser diffraction scattering method) of 0.3 to 1 μm, particularly, the amount of coarse particles of not smaller than 20 μm being not larger than 2% by weight. That is, by using such fine aluminum hydroxide particles, there is obtained the G-LAHS of the invention which helps obtain good transparency when dispersed, particularly, in a resin.

Water is added to the aluminum hydroxide particles of which the particle size has been adjusted as described above, and the lithium carbonate is added to the aqueous slurry to effect the reaction. The reaction is stoichiochemical, and the aluminum hydroxide and the lithium carbonate are used at such a ratio that the atomic ratio of Al/Li becomes 2.

The reaction is, usually, conducted at a temperature of 80 to 130° C. for about 1 to about 10 hours with stirring to obtain a carbonate of the above formula (4a) having a structure in which lithium enters into a vacant site of the aluminum hydroxide octahedral layers of the gibbsite structure, and carbonate ion is incorporated among the octahedral layers to compensate for the electric charge. That is, the lithium ion has the smallest ionic radius among the cations, and is a 6-coordination ion which is exceptional as a monovalent ion. Therefore, the lithium ion enters into the vacant site to form the above-mentioned structure.

The X-ray diffraction image of the carbonate anionic LAHS (Comparative Example 1) is as shown in FIG. 1. From a peak (2θ=11 to 12 degrees) of the plane [001], it will be learned that the aluminum hydroxide octahedral basic layers into which Li has entered has a structure of layers that are laminated in the direction of C-axis.

Here, what is interesting is that when the aluminum hydroxide that is used is adjusted for its particle size to assume the form of fine particles as described above, the G-LAHS of the invention (i.e., aluminosilicate anionic LAHS) obtained from the carbonate anionic LAHS which is an intermediate product, works to exhibit excellent transparency when it is dispersed in a resin. However, the particle size of the carbonate anionic LAHS which is the intermediate product does not almost contribute to improving the transparency. That is, if the above reaction is conducted by using a coarse aluminum hydroxide without adjusting its particle size, the obtained carbonate anionic LAHS is adjusted for its particle size, and the aluminosilicate anionic LAHS is produced by conducting the reaction as described later by using the fine powdery carbonate anionic LAHS, then the degree of transparency of the resin that is blended therewith becomes only slightly higher than that of the carbonate anionic LAHS. Though the reason has not been clarified yet, it is presumed that when the fine powdery aluminum hydroxide of which the particle size has been adjusted is used, lithium effectively infiltrates into a vacant site of the aluminum hydroxide octahedral layers, the reaction proceeds stoichiometrically, and a LAHS is formed having a ratio Li/Al of 2.

In conducting the above reaction, the lithium carbonate as well as the basic magnesium carbonate can also be reacted. In this case, a lithium magnesium aluminum complex hydroxide carbonate expressed by the following formula (4b),

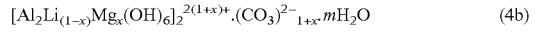  (4b)

wherein x is a number satisfying 0<x<1, and m is zero or a positive integer, is obtained. That is, the carbonate of the above formula (4a) is used as an intermediate starting material for producing the G-LAHS (salt of the above formula (2a)) in which x=0 in the above general formula (2), and the carbonate of the above formula (4b) is used as an intermediate starting material for producing the G-LAHS in which x≠0 in the above general formula (2).

In producing the carbonate of the formula (4b), it is desired that the aluminum hydroxide that is used has been adjusted for its particle size to assume the form of fine particles in the same manner as described above and that the reaction of the aluminum hydroxide with the lithium carbonate and the basic magnesium carbonate is conducted in the presence of an aqueous medium in an autoclave at a temperature of 100 to 180° C. for about 1 to about 10 hours. The lithium carbonate and the basic magnesium carbonate are used in stoichiometric amounts to thereby obtain a carbonate of the formula (4b) having a structure in which lithium and magnesium enter into vacant sites of the aluminum hydroxide octahedral layers of the gibbsite structure in a manner as described above, and a carbonate ion is incorporated among the octahedral layers to compensate for the electric charge.

(2) Substitution into Mineral Acid Anions:

In the present invention, the carbonate (carbonate anionic LAHS) of the formula (4a) or (4b) obtained above is treated with a mineral acid to substitute the carbonate anion by the mineral acid anion. That is, the carbonate anionic LAHS is so stable that the carbonate anion cannot be directly substituted by the aluminosilicate anion. Therefore, the carbonate anion is once substituted by the mineral acid anion.

Sulfuric acid, nitric acid or hydrochloric acid can be used as the mineral acid. Preferably, however, sulfuric acid is used from the standpoint of reactivity. The amount of mineral acid is such that the carbonate anions are substituted in whole amounts by the mineral acid anions. For instance, the mineral acid is used in an amount equivalent to that of lithium carbonate used for producing the carbonate anionic LAHS or in a slightly excess amount.

The treatment with the mineral acid is conducted by adding an aqueous solution of the mineral acid of an acid concentration of about 2 to about 98% by weight to the aqueous slurry of the carbonate anionic LAHS obtained above followed by stirring for about 0.5 to about 10 hours. After the reaction, the reaction product is ripened for about 0.5 to about 10 hours to thereby obtain the mineral acid anionic LAHS in which carbonate anions are substituted by mineral acid anions.

The thus obtained mineral acid anionic LAHS has very high hygroscopic property and is not suited as a compounding agent for resins. According to the present invention, the mineral acid anions in the mineral acid anionic LAHS are substituted by the aluminosilicate anions to obtain the G-LAHS (aluminosilicate anionic LAHS) as contemplated by the invention.

(3) Substitution into Aluminosilicate Anions:

In the invention, the anionic substitution is effected by simultaneously adding the silicic acid soda and the aluminic acid soda to the slurry of the above mineral acid anionic LAHS to effect the reaction at a temperature of 5 to 95° C. for about 0.5 to about 10 hours and, thereafter, aging the reaction product for about 0.5 to about 10 hours, followed by filtration, washing with water and drying to thereby obtain the G-LAHS of the invention expressed by the above general formula (2) in which the mineral acid anions of the mineral acid anionic LAHS are partly substituted by the aluminosilicate anions expressed by the following general formula (1),

  (1)

wherein p, q, r and z are positive numbers satisfying,
5≦z≦20,
z=(p/2)+(3q/2)+2r+1, $0 < p/q < 1$, $0.01 \leq q/r \leq 1$.

In the above anionic substitution, if the silicic acid soda is used alone, there is obtained the silicate anionic LAHS. As described already, however, the resin blended therewith exhibits low transparency. Further, the aluminic acid soda having a high pH that is used alone is not capable of substituting the aluminate ions by the mineral acid anions among the layers. In the present invention, the silicic acid soda and the aluminic acid soda are simultaneously mixed into the slurry of the mineral acid anionic LAHS to substitute the mineral acid anions not in the form of silicate anions but in the form of aluminosilicate anions.

In the invention as described already, the aluminic acid soda and the silicic acid soda are used in amounts of such a ratio that a value q/r in the formula (1) lies in a range of 0.01 to 1 and that not less than 25 mol %, particularly, not less than 50 mol % and, most desirably, not less than 60 mol % of the divalent anions ($A^{2-}$) are substituted by the aluminosilicate anions.

<Production of HT-AHS>

In the present invention, the hydrotalcite type aluminum complex hydroxide salt (HT-AHS) is produced by using a magnesium aluminum complex hydroxide sulfate (abbreviated as MgAl sulfate) expressed by the following formula (5),

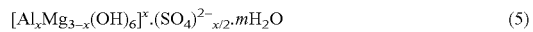

$$[Al_xMg_{3-x}(OH)_6]^x \cdot (SO_4)^{2-}_{x/2} \cdot mH_2O \quad (5)$$

wherein x is a number satisfying $0.6 \leq x \leq 1.5$, and m is zero or a positive integer, as a starting material, reacting the MgAl sulfate with the silicic acid soda and the aluminic acid soda, and substituting the sulfate anions in the formula (5) by the aluminosilicate anions expressed by the above formula (1).

The MgAl sulfate used as the starting material is a widely known compound and its production method has been closely described in, for example, JP-A-2001-2408. For example, the magnesium chloride and the aluminum sulfate are added to NaOH with stirring so as to react in an autoclave in the presence of an aqueous medium to directly obtain the MgAl sulfate of the formula (5).

The MgAl salt of the above formula (5) can also be obtained by adding the aluminum chloride instead of the aluminum sulfate as an aluminum source and adding the sodium carbonate instead of NaOH to effect the reaction in the autoclave in the presence of an aqueous medium in order to synthesize a carbonate expressed by the following formula,

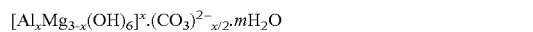

$$[Al_xMg_{3-x}(OH)_6]^x \cdot (CO_3)^{2-}_{x/2} \cdot mH_2O$$

wherein x and m are as defined in the formula (5), and treating the carbonate with the sulfuric acid to substitute the carbonate anions by the sulfate anions (if the sulfate is used as the starting material instead of using the carbonate as the starting material, the carbonate anions are very stable and cannot be directly substituted by the aluminosilicate anions as described above).

In the invention, the MgAl sulfate is reacted with the silicic acid soda and with the aluminic acid soda to obtain a hydrotalcite type aluminum complex hydroxide salt (HT-AHS) expressed by the general formula (3),

$$[Al_xMg_{3-x}(OH)_6]^x \cdot A^{2-}_{x/2} \cdot mH_2O \quad (3)$$

wherein $A^{2-}$ is the divalent anion among the layers, x is a number satisfying $0.6 \leq x < 1.5$, and m is zero or a positive integer, in which the sulfate anions in the above formula (5) are substituted by the aluminosilicate anions expressed by the above formula (1). The above reaction is conducted by simultaneously adding the silicic acid soda and the aluminic acid soda to a slurry of the MgAl sulfate with stirring, continuing the reaction at a temperature of 5 to 95° C. for about 0.5 to about 10 hours, ripening the reaction product for about 0.5 to about 10 hours, followed by filtration, washing with water and drying to obtain the desired HT-AHS. Further, like in the same manner as when the above G-LAHS is produced, the silicic acid soda and the aluminic acid soda are used in amounts of such a ratio that a value q/r in the formula (1) lies in a range of 0.01 to 1 and that not less than 25 mol %, particularly, not less than 50 mol % and, most desirably, not less than 60 mol % of the divalent anions ($A^{2-}$) are substituted by the aluminosilicate anions.

<Use>

The aluminum complex hydroxide salt of the invention obtained as described above is, for example, finely pulverized to so adjust the particle size that the average particle size $D_{50}$ is about 0.3 to about 1 μm. Further, the aluminum complex hydroxide salt, usually, has a bulk density of 0.05 to 0.3 g/cm³, a BET specific surface area of 20 to 50 m²/g, and a refractive index of 1.49 to 1.51.

The aluminum complex hydroxide salt is expressed by, for example, the above formula (2) or (3). As described already, the resin blended therewith exhibits excellent transparency. As will become obvious from the IR analysis that will be described later, further, the aluminum complex hydroxide salt exhibits many absorption peaks offering excellent heat retaining property, and is very suited for use as a heat retaining agent, particularly, for agricultural films.

For use being mixed in the resin, the aluminum complex hydroxide salt is treated for its surfaces by adding a higher fatty acid or a surfactant thereto to enhance the dispersion property in the resin.

As the higher fatty acid, there can be used saturated or unsaturated fatty acid having 10 to 22 carbon atoms and, particularly, 14 to 18 carbon atoms; i.e., saturated fatty acids such as capric acid, undecanoic acid, lauric acid, myristic acid, palmitic acid, margaric acid, stearic acid and arachic acid, as well as unsaturated fatty acids such as linderic acid, tsuzuic acid, petroselinic acid, oleic acid, linoleic acid, linolenic acid and arachidonic acid. Stearic acid is preferred. The fatty acid may be a mixed fatty acid such as of beef tallow fatty acid, coconut oil fatty acid and palm oil fatty acid.

The anionic surfactant may be any one of, for example, primary higher alcohol sulfuric ester, secondary higher alcohol sulfuric ester, primary higher alkylsulfonate, secondary higher alkylsulfonate, higher alkyldisulfonate, sulfonated higher fatty acid salt, sulfuric ester of higher fatty acid, sulfonate of higher fatty acid ester, sulfuric ester of higher alcohol ether, sulfonate of higher-alcohol ether, sulfuric ester of alkylol higher fatty acid, alkylbenzene sulfonate, alkylphenol sulfonate, alkylnaphthalene sulfonate or alkylbenzoimidazole sulfonate. Concrete compound names of these surfactants have been disclosed in, for example, "Synthetic Surfactants" by Hiroshi Horiguchi, 1966 (published by Sankyo Shuppan Co.)

As the nonionic surfactant, there is used a nonionic surfactant having a low HLB and, particularly, having an HLB of lower than 12 and, most desirably, lower than 8. Usually, there is used any one of polyoxyethylenealkyl ether, polyoxyethylenealkylphenyl ether, polyoxyethylene fatty acid ester, polyoxyethylene fatty acid amide ether, polyhydric alcohol fatty acid ester, polyoxyethylene polyhydric alcohol fatty acid ester, fatty acid sucrose ester, alkylolamide or polyoxyalkylene block copolymer having an HLB lying within the above range. With these nonionic surfactants, in general, the HLB decreases with a decrease in the amount of the polyoxyethylene units. Therefore, the nonionic surfactant having a desired HLB can be obtained by adjusting the additional number of mols of the ethylene oxide.

It is desired that the fatty acid or the surfactant is added in an amount of 0.5 to 15% by weight and, particularly, 1 to 10% by weight per the aluminum complex hydroxide salt.

Though there is no particular limitation, it is desired that the treatment is conducted, usually, under the conditions of a temperature of 60 to 100° C. for about 0.5 to about 5 hours with stirring. In the case of the fatty acid, the fatty acid that is used reacts with sodium ions present in the reaction system and migrates into the aqueous phase in the form of a sodium soap accelerating the surface treatment of the aluminum complex hydroxide that is formed. The same reaction also takesplace for the anionic surfactant if an organic acid which is not a salt is used. The reaction product after the treatment is subjected to a known solid-liquid separation operation such as filtering or centrifuge so as to be removed from the mother liquor, washed with water to a sufficient degree, dried and, as required, is pulverized to obtain a product. The thus obtained surface-treated aluminum complex hydroxide can be readily used as a compounding agent for resins or, as required, can, further, be subjected to the after-treatment by using a known organic or inorganic assisting agent.

The aluminum complex hydroxide salt of the invention is added in an amount of, usually, 0.01 to 25 parts by weight per 100 parts by weight of the resin. When used as the heat retaining agent, in particular, the aluminum complex hydroxide salt of the invention is used in an amount of 2 to 10 parts by weight to impart excellent heat retaining property and transparency.

There is no particular limitation on the resin to be blended therewith, and there can be exemplified a chlorine-contained polymer such as polyvinyl chloride, polyvinylidene chloride, chlorinated polyvinyl chloride, chlorinated polyethylene, chlorinated polypropylene, chlorinated rubber, vinyl chloride/vinyl acetate copolymer, vinyl chloride/ethylene copolymer, vinyl chloride/propylene copolymer, vinyl chloride/styrene copolymer, vinyl chloride/isobutylene copolymer, vinyl chloride/vinylidene chloride copolymer, vinyl chloride/styrene/maleic anhydride tercopolymer, vinyl chloride/styrene/acrylonitrile copolymer, vinyl chloride/butadiene copolymer, vinyl chloride/propylene chloride copolymer, vinyl chloride/vinylidene chloride/vinyl acetate tercopolymer, vinyl chloride/acrylic acid ester copolymer, vinyl chloride/maleic acid ester copolymer, vinyl chloride/methacrylic acid ester copolymer, vinyl chloride/acrylonitrile copolymer, and internally plasticized polyvinyl chloride; a polymer blend of these chlorine-contained polymer and other polymer. The other polymer includes an α-olefin polymer such as polyethylene, polypropylene, polybutene or poly-3-methylbutene; a polyolefin copolymer such as ethylene/vinyl acetate copolymer or ethylene/propylene copolymer; copolymers of polystyrene, acrylic resin and styrene with other monomers such as maleic anhydride, butadiene, acrylonitrile, etc; and acrilonitrile/butadiene/styrene copolymer; acrylic acid ester/butadiene/styrene copolymer; and methacrylic acid ester/butadiene/styrene copolymer. In particular, the aluminum complex hydroxide salt of the invention has excellent infrared-ray absorption spectrum, excellent heat retaining property and excellent transparency, and is very suited for use in an agricultural film such as a house film, for example, an agricultural polyvinyl chloride film, an agricultural polyvinyl acetate film or an agricultural polyolefin film.

The resin composition blended with the Al complex hydroxide salt of the present invention can be, further, blended with various known additives such as stabilizer, stability assistant, lubricating agent, plasticizer, ultraviolet ray-absorbing agent, antioxidant, photo stabilizer, nucleating agent, anti-hazing agent, liquid drop-flowing agent, anti-fuming agent, coloring agent, other heat retaining agents and filler. These resin additives are used in an amount so that the resin additives exhibit their property and when the resin additives and the Al complex hydroxide of the invention are mixed together and formed into particles (in a pelletized shape, granular shape, spherical shape, etc.), whereby fine powdery dust does not develop and the feeding at a constant rate can be improved As the ultraviolet-ray absorbing agent, there can be used a hydroxybenzophenone compound, a hydroxybenzotriazole compound or a benzoate compound.

As the antioxidant, there can be used any one of phenolic antioxidant, sulfur antioxidant or phosphite antioxidant. As the phenolic antioxidant, there can be exemplified bisphenol antioxidant or sterically hindering phenol antioxidant.

As the photo stabilizer, there can be exemplified hindered amine photo stabilizers (HALS), such as
2,2,6,6-tetramethyl-4-piperidyl stearate,
1,2,2,6,6-pentamethyl-4-piperidyl stearate,
2,2,6,6-tetramethyl-4-piperidyl benzoate,
N-(2,2,6,6-tetramethyl-4-piperidyl)dodecyl succinimide,
1-[(3,5-di-tertiary butyl-4-hydroxyphenyl)propionyloxyethyl]-2,2,6,6-tetramethyl-4-piperidyl-(3,5-di-tertiary butyl-4-hydroxyphenyl)propionate,
bis(2,2,6,6-tetramethyl-4-piperidyl)sebacate,
bis(1,2,2,6,6-pentamethyl-4-piperidyl)sebacate,
bis(1,2,2,6,6-pentamethyl-4-piperidyl)-2-butyl-2-(3,5-di-tertiary butyl-4-hydroxybenzyl)malonate,
N,N'-bis(2,2,6,6-tetramethyl-4-piperidyl) hexamethylenediamine,
tetra(2,2,6,6-tetramethyl-4-piperidyl) butanetetracarboxylate,
tetra(1,2,2,6,6-pentamethyl-4-piperidyl) butanetetracarboxylate,
bis(2,2,6,6-tetramethyl-4-piperidyl).di(tridecyl) butanetetracarboxylate,
bis(1,2,2,6,6-pentamethyl-4-piperidyl).di(tridecyl) butanetetracarboxylate,
3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5,5]undecane,
3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5,5]undecane,
1,5,8,12-tetrakis[4,6-bis{N-(2,2,6,6-tetramethyl-4-piperidyl)butylamino}-1,3,5-triazine-2-il]-1,5,8,12-tetraazadodecane,
1-(2-hydroxyethyl)-2,2,6,6-tetramethyl-4-piperidinol/dimethyl succinate condensate,
2-tertiary octylamino-4,6-dichloro-s-triazine/N,N'-bis(2,2,6,6-tetramethyl-4-piperidyl)hexamethylene diamine condensate, and
N,N'-bis(2,2,6,6-tetramethyl-4-piperidyl)hexamethylene diamine/dibromoethane condensate.

The film is formed by melt-kneading the resin composition by using a blender or a kneader, such as the Henschel's mixer, super-mixer, Bumbury's mixer, ribbon blender, monoaxial or biaxial extruder or rolls and, thereafter, extruding the resin composition through a die and subjecting the resin composition to the inflation film-forming method or the T-die method. The film may be of a single layer or a laminated film having a multiplicity of layers. The latter laminated film is obtained by co-extrusion.

When the laminated film is to be blended with the aluminum complex hydroxide salt of the invention as a heat retaining agent, the aluminum complex hydroxide salt is chiefly mixed into the intermediate layer. The aluminum complex hydroxide salt, however, may also be mixed into the inner layer and the outer layer which are covering layers to a degree which does not impair the transparency.

As for a treating method related to the anti-hazing of film, liquid drop-flowing and anti-fuming, it is also possible to form a liquid drop-flowing layer on the inner surface of the film in addition to mixing the treating agents into the resin.

EXAMPLES

The invention will now be described by way of Examples to which only, however, the invention is in no way limited. In Examples, measurements were taken by methods as described below.

(1) Volume Average Particle Size ($D_{50}$);

Measured by the laser diffraction scattering method by using the LS230 manufactured by Coulter Co.

(2) Chemical Composition;

After fired at 1050° C. for one hour, the sample was left to cool, and the Ig-loss was determined from a decrease in the amount. The sample was decomposed with alkali fusion, $SiO_2$ was determined by the gravimetric method, MgO was determined by the chelate titration method, $Al_2O_3$ was measured by the EDTA-zinc back titration method, and $SO_4$ was determined by the $Pb(NO_3)_2$-EDTA titration chelate titration. Further, after decomposed with a hydrofluoric acid, the sample was filtered and the obtained filtrate was measured for $Li_2O$ and $Na_2O$ by the atomic absorption method to determine the metal components. The sample was, further, decomposed with sulfuric acid, and the generated $CO_2$ was determined by the back neutralization titration to find $CO_3$.

Here, the sample after dried at 110° C. for 2 hours is regarded to be a reference sample.

(3) X-Ray Diffraction;

Measured with Cu-Kα by using the PW1830 manufactured by PHILIPS Co.

Target: Cu
Filter: Curved crystal graphite monochrometer
Detector: SC
Voltage: 40 kV
Current: 30 mA
Step size: 0.03°
Measuring time: 0.03 sec
Slit: DS1° RS 0.2 mm SS1°

(4) Bulk Density;

Measured in compliance with the JIS K 6721.

(5) BET Specific Surface Area;

The BET specific surface area was measured for a nitrogen adsorption isothermal line by using the Tri Star 3000 manufactured by Micrometrics Co., and was found from the nitrogen adsorption isothermal line on the adsorption branch side of a specific pressure of not larger than 0.2 according to the BET method.

(6) Refractive Index;

A solvent (α-bromonaphthalene, kerosene) of which the refractive index has been known was prepared in advance by using the Abbe's refractometer. Next, according to the Larsen's oil immersion method, a sample powder in an amount of several milligrams was put onto a slide glass, a drop of the solvent of which the refractive index has been known was added thereto, a cover glass was placed thereon, and after having been fully immersed with the solvent, movement of the Becke line was observed by using an optical microscope to find the refractive index.

(7) Haze and Heat Retaining Property (Infrared-Ray Absorbing Property) of the Film;

A film for agricultural use of the following blend was prepared and evaluated for its haze and heat retaining property (infrared-ray absorbing property).

Blend:

| | |
|---|---|
| EVA (vinyl acetate content, 15%) | 88.8% by weight |
| Heat retaining agent (see Table 1) | 10.0% by weight |
| Ultraviolet-ray absorber (Sumisobe, manufactured by Sumitomo Kagaku Co.) | 0.1% by weight |
| Antioxidant (butylhydroxytoluene) | 0.3% by weight |
| Photo stabilizer (Chinubin 622-LD, manufactured by Chiba Geigy Co.) | 0.5% by weight |
| Lubricant (erucic amide) | 0.3% by weight |

The above resin composition was obtained by conducting the roll-kneading at 120° C. The resin composition was pressed to prepare an EVA single-layer film of 100 μm. The obtained film was measured for its infrared-ray absorption over a range of 2500 $cm^{-1}$ to 400 $cm^{-1}$ (4 μm to 25 μm), and the heat retaining ratio was found from the absorbency at the measured wave numbers and the values of black body radiation densities in compliance with the following formula, Heat retaining ratio(%)=100×Σ{(1−transmission factor % T/100)×black body radiation density}/Σ black body radiation density Here, the black body radiation energy that was used was derived from the following Planck's formula, $$W_{\lambda,T}=c_1\lambda^{-5}/\{\exp(c_2/\lambda T)-1\}$$

$W_{\lambda,T}$: Spectral radiation density at wavelength λ and temperature T (W/$cm^2$)

$c_1$: 3.7402×$10^{-12}$ (W·$cm^2$, Planck's first radiation constant)

$c_2$: 1.4388 (cm·deg, Planck's second radiation constant)

The heat retaining effect increases with an increase in the heat retaining ratio.

Further, the composition obtained above was pressed being held between two pieces of Salan wraps to prepare a pseudo three-layer-laminated film of 100 μm. The haze was measured in compliance with the ASTM D 1003-95. The smaller the haze value, the more excellent the transparency.

The apparatus used for the measurement was the Haze-Gard Plus manufactured by Gardner Co.

Comparative Example 1

220 Grams of the aluminum hydroxide (B52 manufactured by Nihon Light Metal Co.) was dispersed in 3780 g of water. The slurry thereof was transferred into a 15-L pot mill containing 16.5 kg of φ=2 mm alumina balls, and was wet-pulverized until it possessed an average particle size of $D_{50}$=0.48 μm (coarse particles of not smaller than 10 μm, 0% by weight).

1818 Grams of the pulverized slurry (100 g of aluminum hydroxide) was taken out, and was put into a 3-L beaker together with 282 g of water and 23.75 g of lithium carbonate. The mixture was heated up to 95° C. and was reacted with stirring for 6 hours to form crystals thereof (step 1).

8.0 Grams of stearic acid was added to the reacted slurry to treat the surface thereof for 2 hours, and the slurry was filtered through the Nutsche. The cake was dried at 110° C. and was pulverized to obtain a carbonate type LAHS, $$[Al_2Li(OH)_6]_2{}^{2+} \cdot CO_3{}^{2-} \cdot 1.6H_2O$$

of which the surface has been treated with the stearic acid.

Figure 5:
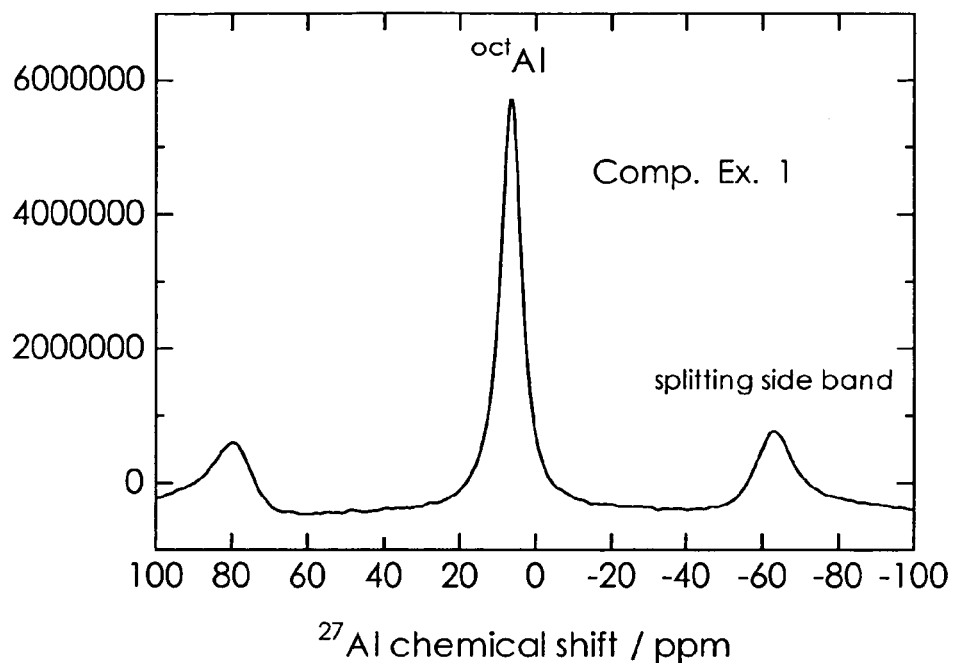
FIG. 5 is a chart of the carbonate anionic LAHS (Comparative Example 1) as measured by the $^{27}$Al-solid NMR.

Table 1 shows the results of properties thereof that were measured, FIG. 1 shows an X-ray diffraction diagram thereof and FIG. 5 shows a diagram of $^{27}$Al-solid NMR measurement. Further, the bulk density was 0.10 g/ml, the BET specific surface area was 34 m$^2$/g and the refractive index was 1.53.

Comparative Example 2

To the slurry reacted in the same manner as up to the step 1 of Comparative Example 1, 41.98 g of 75% sulfuric acid was added dropwise over a period of one hour to effect aging for one hour (step 2).

Further, 8.0 g of sodium stearate was added to the reacted slurry to treat the surface thereof for 2 hours, and the slurry was filtered through the Nutsche and was washed with hot water. The cake thereof was dried at 110° C., pulverized and was analyzed for its chemical composition to learn that there was obtained a sulfate type LAHS, $$[Al_2Li(OH)_6]^{2+} \cdot (SO_4)^{2-}{}_{0.95} \cdot (CO_3)^{2-}{}_{0.05} \cdot 1.4H_2O$$

of which the surface has been treated with the sodium stearate.

Table 1 shows the results of properties thereof that were measured.

Comparative Example 3

To the slurry reacted in the same manner as up to the step 2 of Comparative Example 2, there was added dropwise a mixed solution of 144.4 g of aluminic acid soda (22.7% of Al$_2$O$_3$, 18.2% of Na$_2$O) and 215.6 of water over a period of one hour to effect aging for one hour.

Figure 2:
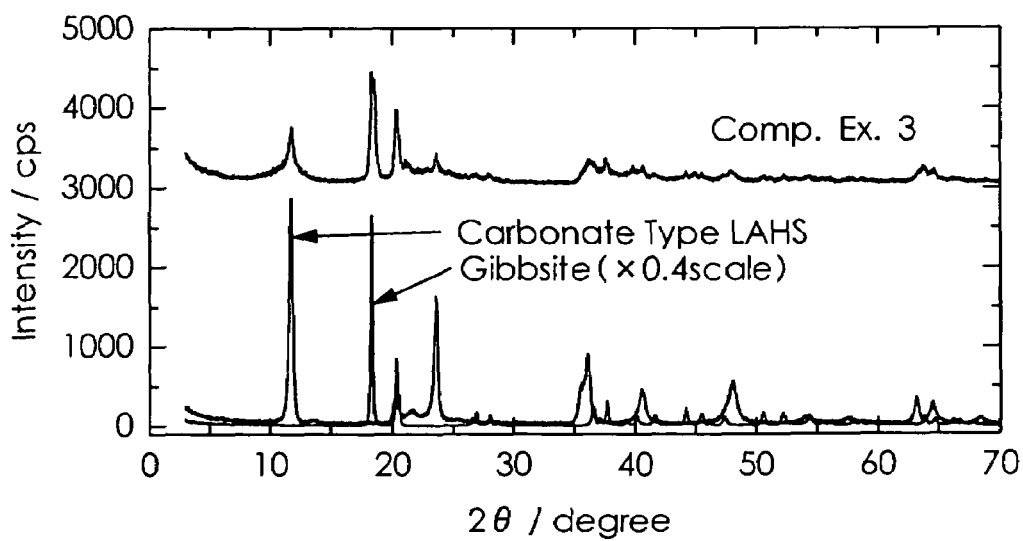
FIG. 2 is an X-ray diffraction diagram of a mixture of the carbonate anionic LAHS and an aluminum hydroxide (gibbsite)(Comparative Example 3), of the carbonate anionic LAHS and of the aluminum hydroxide (gibbsite)

Further, 8.0 g of stearic acid was added to the reacted slurry to treat the surface thereof for 2 hours, and the slurry was filtered through the Nutsche and was washed with hot water. The cake thereof was dried at 110° C., pulverized and was analyzed for its structure by the X-ray diffraction to learn that there was obtained a mixture of the carbonate type LAHS and the aluminum hydroxide (gibbsite) (FIG. 2 shows an X-ray diffraction diagram thereof). It was, therefore, learned that the aluminate ions could not be exchanged alone as anionic species.

Comparative Example 4

There was used a complex hydroxide condensed silicate, Optima SS, manufactured by Toda Kogyo Co. Analysis of the chemical composition indicated it to be a silicate type complex hydroxide salt, $$[Al_2Li_{0.92}Mg_{0.08}(OH)_6]_2{}^{2.16+} \cdot (Si_{3.7}O_{8.4})^{2-}{}_{0.51} \cdot (SO_4)^{2-}{}_{0.10} \cdot (CO_3)^{2-}{}_{0.47} \cdot 2.6H_2O$$

Figure 3:
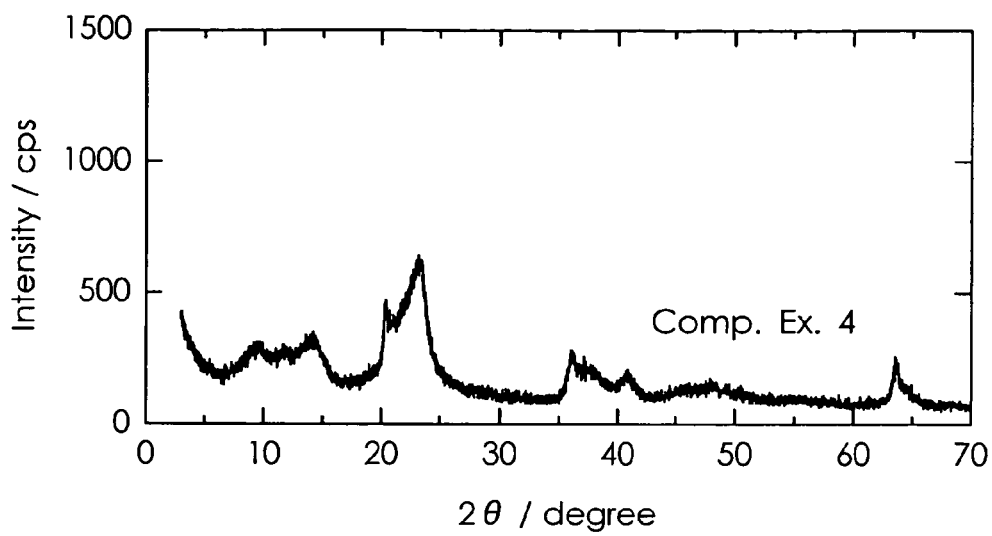
FIG. 3 is an X-ray diffraction diagram of a silicate type complex hydroxide salt (Comparative Example 4)

Table 1 shows the results of properties thereof that were measured, and FIG. 3 shows an X-ray diffraction diagram thereof.

Example 1

To the slurry reacted in the same manner as up to the step 2 of Comparative Example 2, there were simultaneously added dropwise a mixed solution (A) of 144.4 g of aluminic acid soda (22.7% of Al$_2$O$_3$, 18.2% of Na$_2$O) and 215.6 g of water and a mixed solution (B) of 171.1 g of silicic acid soda (23.7% of SiO$_2$, 7.53% of Na$_2$O) and 188.9 g of water over a period of one hour to effect aging for one hour.

Further, 8.0 g of stearic acid was added to the reacted slurry to treat the surface thereof for 2 hours, and the slurry was filtered through the Nutsche and was washed with hot water. The cake thereof was dried at 110° C., pulverized and was analyzed for its chemical composition to learn that there was obtained a G-LAHS (aluminosilicate anionic LAHS), $$[Al_2Li(OH)_6]_2{}^{2+} \cdot (Na_{0.7}Al_{2.2}Si_{2.8}O_{10.3})^{2-}{}_{0.82} \cdot (SO_4)^{2-}{}_{0.10} \cdot (CO_3)^{2-}{}_{0.08} \cdot 3.9H_2O$$

of which the surface has been treated with the stearic acid.

Figure 6:
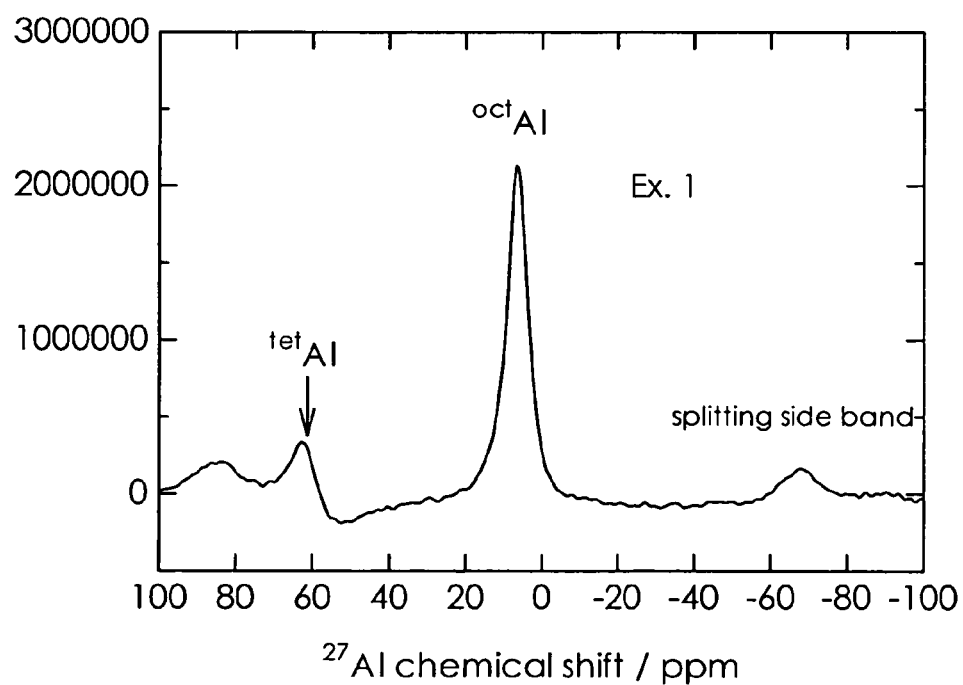
FIG. 6 is a chart of the aluminosilicate anionic LAHS (Example 1) of the present invention as measured by the $^{27}$Al-solid NMR.

Table 1 shows the results of properties thereof that were measured, and FIG. 6 shows a diagram of $^{27}$Al-solid NMR measurement. Further, the bulk density was 0.11 g/ml and the refractive index was 1.50.

Example 2

An aluminosilicate anionic LAHS, $$[Al_2Li(OH)_6]_2{}^{2+} \cdot (Na_{1.3}Al_{2.8}Si_{4.0}O_{13.9})^{2-}{}_{0.81} \cdot (SO_4)^{2-}{}_{0.11} \cdot (CO_3)^{2-}{}_{0.08} \cdot 3.6H_2O$$

of which the surface has been treated with the stearic acid, was obtained in the same manner as in Example 1 but changing the solution (B) to contain 244.5 g of silicic acid soda and 115.5 g of water.

Table 1 shows the results of properties thereof that were measured. Further, the bulk density was 0.11 g/ml and the refractive index was 1.50.

Example 3

An aluminosilicate anionic LAHS, $$[Al_2Li(OH)_6]_2{}^{2+} \cdot (Na_{1.9}Al_{3.0}Si_{5.2}O_{16.9})^{2-}{}_{0.79} \cdot (SO_4)^{2-}{}_{0.12} \cdot (CO_3)^{2-}{}_{0.09} \cdot 3.4H_2O$$

of which the surface has been treated with the stearic acid, was obtained in the same manner as in Example 1 but changing the solution (B) to contain 334.1 g of silicic acid soda and 25.9 g of water.

Table 1 shows the results of properties thereof that were measured and FIG. 1 shows an X-ray diffraction diagram thereof. Further, the bulk density was 0.11 g/ml and the refractive index was 1.50.

Example 4

An aluminosilicate anionic LAHS, $$[Al_2Li(OH)_6]_2{}^{2+} \cdot (Na_{0.1}Al_{1.8}Si_{2.0}O_{7.8})^{2-}{}_{0.83} \cdot (SO_4)^{2-}{}_{0.09} \cdot (CO_3)^{2-}{}_{0.08} \cdot 3.1H_2O$$

of which the surface has been treated with the stearic acid, was obtained in the same manner as in Example 1 but changing the solution (A) to contain 108.3 g of aluminic acid soda and 251.7 g of water and changing the solution (B) to contain 122.2 g of silicici acid soda and 237.8 g of water.

Example 5

An aluminosilicate anionic LAHS, $$[Al_2Li(OH)_6]_2^{2+} \cdot (Na_{0.6}Al_{1.8}Si_{2.8}O_{9.6})^{2-}_{0.84} \cdot (SO_4)^{2-}_{0.09} \cdot (CO_3)^{2-}_{0.07} \cdot 2.6H_2O$$

of which the surface has been treated with the stearic acid, was obtained in the same manner as in Example 4 but changing the solution (B) to contain 183.4 g of silicic acid soda and 176.6 g of water.

Table 1 shows the results of properties thereof that were measured. Further, the bulk density was 0.09 g/ml and the refractive index was 1.50.

Example 6

An aluminosilicate anionic LAHS, $$[Al_2Li(OH)_6]_2^{2+} \cdot (Na_{0.9}Al_{2.1}Si_{3.6}O_{11.8})^{2-}_{0.83} \cdot (SO_4)^{2-}_{0.10} \cdot (CO_3)^{2-}_{0.07} \cdot 2.9H_2O$$

of which the surface has been treated with the stearic acid, was obtained in the same manner as in Example 4 but changing the solution (B) to contain 244.5 g of silicic acid soda and 115.5 g of water.

Table 1 shows the results of properties thereof that were measured. Further, the bulk density was 0.12 g/ml and the refractive index was 1.50.

Example 7

An aluminosilicate anionic LAHS, $$[Al_2Li(OH)_6]_2^{2+} \cdot (Na_{0.3}Al_{1.4}Si_{2.5}O_{8.3})^{2-}_{0.84} \cdot (SO_4)^{2-}_{0.10} \cdot (CO_3)^{2-}_{0.06} \cdot 2.6H_2O$$

of which the surface has been treated with the stearic acid, was obtained in the same manner as in Example 4 but changing the solution (A) to contain 72.18 g of aluminic acid soda and 287.8 g of water and changing the solution (B) to contain 163.0 g of silicic acid soda and 197.0 g of water.

Table 1 shows the results of properties thereof that were measured. Further, the bulk density was 0.13 g/ml and the refractive index was 1.50.

Example 8

An aluminosilicate anionic LAHS, $$[Al_2Li(OH)_6]_2^{2+} \cdot (Na_{0.6}Al_{1.9}Si_{3.5}O_{11.2})^{2-}_{0.80} \cdot (SO_4)^{2-}_{0.13} \cdot (CO_3)^{2-}_{0.07} \cdot 2.4H_2O$$

of which the surface has been treated with the stearic acid, was obtained in the same manner as in Example 7 but changing the solution (B) to contain 244.5 g of silicic acid soda and 115.5 g of water.

Table 1 shows the results of properties thereof that were measured. Further, the BET specific surface area was 39 m²/g and the refractive index was 1.50.

Example 9

An aluminosilicate anionic LAHS, $$[Al_2Li(OH)_6]_2^{2+} \cdot (Na_{0.6}Al_{1.1}Si_{4.4}O_{11.8})^{2-}_{0.76} \cdot (SO_4)^{2-}_{0.18} \cdot (CO_3)^{2-}_{0.07} \cdot 2.6H_2O$$

of which the surface has been treated with the stearic acid, was obtained in the same manner as in Example 7 but changing the solution (A) to contain 43.31 g of aluminic acid soda and 316.7 g of water and changing the solution (B) to contain 326.0 g of silicic acid soda and 34.0 g of water.

Table 1 shows the results of properties thereof that were measured. Further, the BET specific surface area was 29 m²/g and the refractive index was 1.50.

Example 10

An aluminosilicate anionic LAHS, $$[Al_2Li(OH)_6]_2^{2+} \cdot (Na_{0.4}Al_{1.6}Si_{3.7}O_{11.0})^{2-}_{0.76} \cdot (SO_4)^{2-}_{0.17} \cdot (CO_3)^{2-}_{0.07} \cdot 2.0H_2O$$

of which the surface has been treated with the stearic acid, was obtained in the same manner as in Example 9 but changing the solution (B) to contain 244.5 g of silicic acid soda and 115.5 g of water.

Table 1 shows the results of properties thereof that were measured. Further, the BET specific surface area was 31 m²/g and the refractive index was 1.50.

Example 11

An aluminosilicate anionic LAHS, $$[Al_2Li(OH)_6]_2^{2+} \cdot (Na_{0.1}Al_{1.5}Si_{2.6}O_{8.5})^{2-}_{0.80} \cdot (SO_4)^{2-}_{0.14} \cdot (CO_3)^{2-}_{0.06} \cdot 1.6H_2O$$

of which the surface has been treated with the stearic acid, was obtained in the same manner as in Example 9 but changing the solution (B) to contain 163.0 g of silicic acid soda and 197.0 g of water.

Table 1 shows the results of properties thereof that were measured. Further, the BET specific surface area was 27 m²/g and the refractive index was 1.50.

Example 12

An aluminosilicate anionic LAHS, $$[Al_2Li(OH)_6]_2^{2+} \cdot (Na_{0.037}Al_{0.04}Si_{4.0}O_{9.1})^{2-}_{0.74} \cdot (SO_4)^{2-}_{0.20} \cdot (CO_3)^{2-}_{0.06} \cdot 1.8H_2O$$

of which the surface has been treated with the stearic acid, was obtained in the same manner as in Example 9 but changing the solution (A) to contain 21.66 g of aluminic acid soda and 338.3 g of water.

Figure 7:
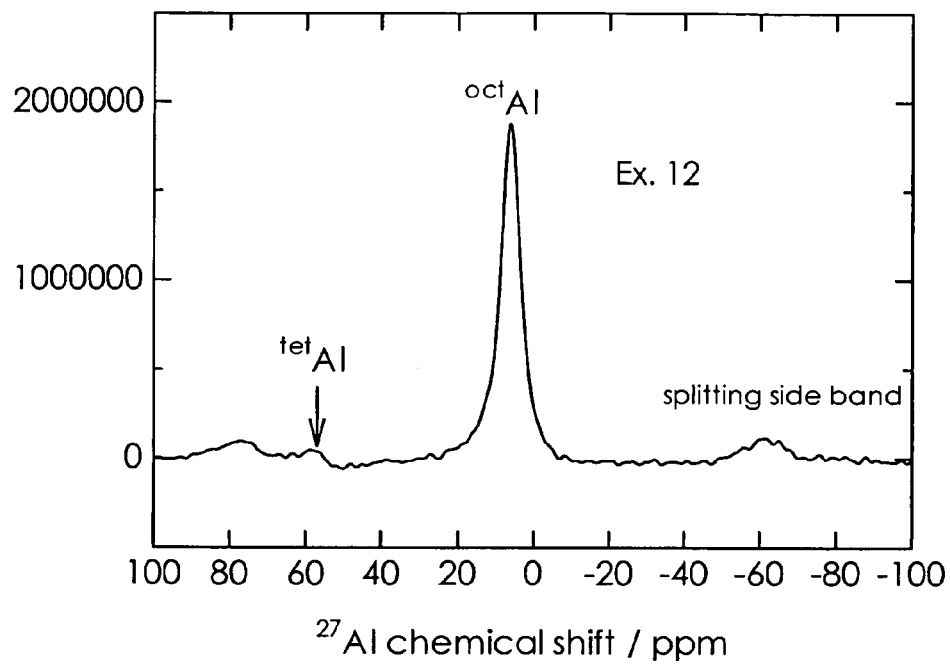
FIG. 7 is a chart of the aluminosilicate anionic LAHS (Example 12) of the present invention as measured by the $^{27}$Al-solid NMR.

Table 1 shows the results of properties thereof that were measured, and FIG. 7 shows a diagram of $^{27}$Al-solid NMR measurement. Further, the BET specific surface area was 23 m²/g and the refractive index was 1.50.

Example 13

An aluminosilicate anionic LAHS, $$[Al_2Li(OH)_6]_2^{2+} \cdot (Na_{0.1}Al_{0.6}Si_{3.6}O_{9.2})^{2-}_{0.73} \cdot (SO_4)^{2-}_{0.21} \cdot (CO_3)^{2-}_{0.06} \cdot 1.4H_2O$$

of which the surface has been treated with the stearic acid, was obtained in the same manner as in Example 12 but changing the solution (B) to contain 244.5 g of silicic acid soda and 115.5 g of water.

Table 1 shows the results of properties thereof that were measured. Further, the BET specific surface area was 29 m²/g and the refractive index was 1.50.

Example 14

An aluminosilicate anionic LAHS,

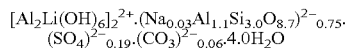
$[Al_2Li(OH)_6]_2{}^{2+} \cdot (Na_{0.03}Al_{1.1}Si_{3.0}O_{8.7})^{2-}{}_{0.75} \cdot$
$(SO_4)^{2-}{}_{0.19} \cdot (CO_3)^{2-}{}_{0.06} \cdot 4.0H_2O$ of which the surface has been treated with the stearic acid, was obtained in the same manner as in Example 12 but changing the solution (B) to contain 163.0 g of silicic acid soda and 197.0 g of water.

Table 1 shows the results of properties thereof that were measured. Further, the BET specific surface area was 28 m$^2$/g and the refractive index was 1.50.

Example 15

A solution of 316.0 g of water in which 45.2 g of sodium hydroxide has been dissolved was slowly added with stirring to a solution of 146.3 g of water in which have been dissolved 77.8 g of magnesium chloride hexahydrate and 111.4 g of alumina sulfate (17.0% of Al$_2$O$_3$ and 18.4% of SO$_3$) so that a gel was precipitated. The slurry thereof was put into a 1-L autoclave, reacted at 170° C. for 4 hours with stirring, filtered through the Nutsche and was washed with hot water to obtain a cake thereof. Part of the cake was dried overnight at 110° C. to obtain a sulfate type HT-AHS, $[Al_{2.1}Mg_{0.9}(OH)_6]^{0.9+} \cdot (SO_4)^{2-}{}_{0.43} \cdot$
$(CO_3)^{2-}{}_{0.02} \cdot 1.4H_2O$ The cake in an amount of 10 g calculated as a dry product thereof was introduced into a 500-ml beaker and was dispersed again in 160 ml of water. To the slurry thereof, there were added dropwise a mixed solution (A) of 3.72 g of aluminic acid soda (23.3% of Al$_2$O$_3$, 19.2% of Na$_2$O) and 21.3 g of water and a mixed solution (B) of 13.44 g of silicic acid soda (22.8% of SiO$_2$, 7.27% of Na$_2$O) and 11.6 g of water over a period of one hour to effect aging for one hour.

Figure 4:
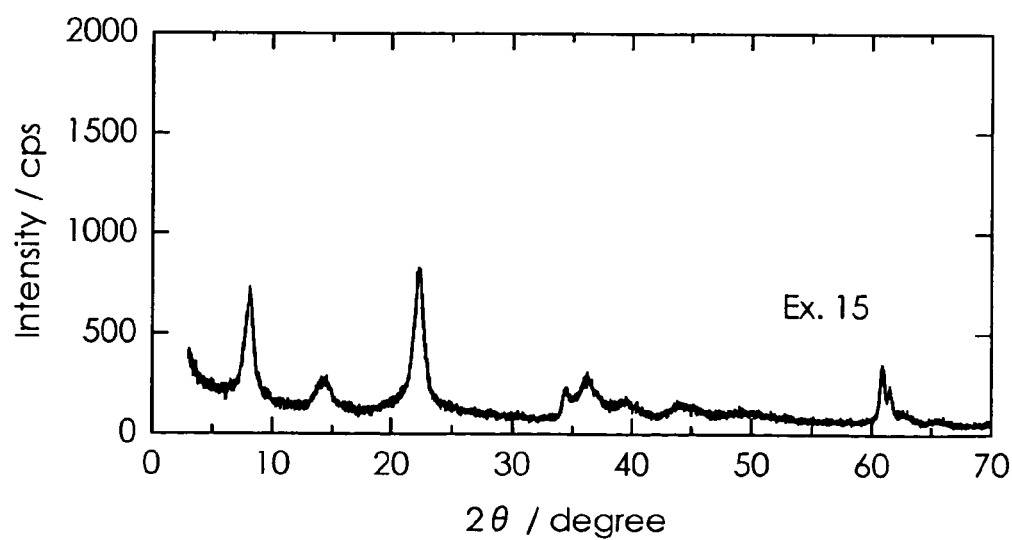
FIG. 4 is an X-ray diffraction diagram of an aluminosilicate anionic hydrotalcite (Example 15) of the present invention.
Figure 8:
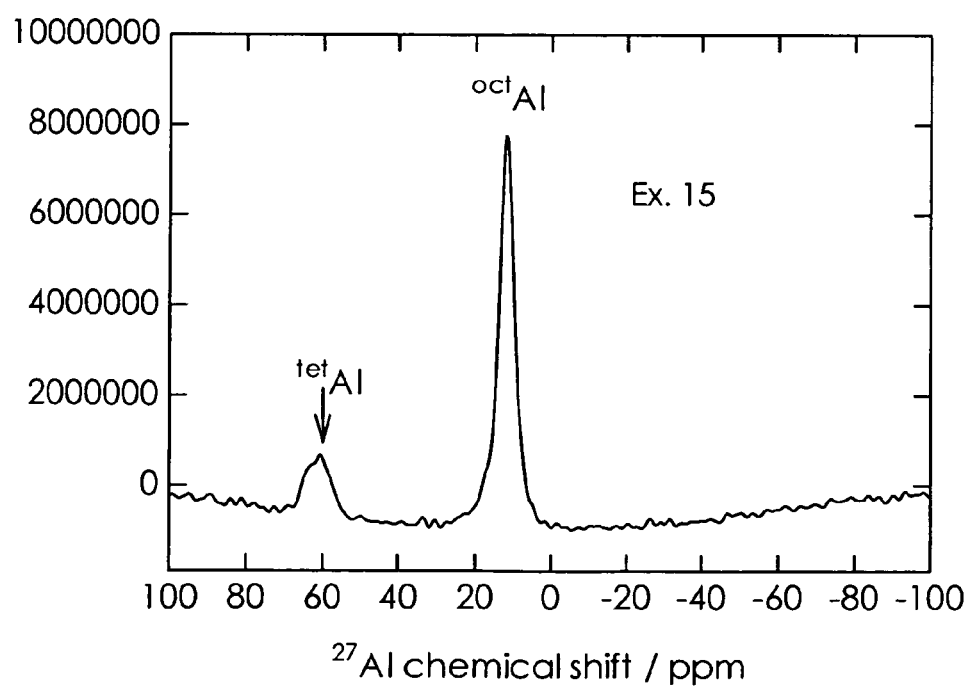
FIG. 8 is a chart of the aluminosilicate anionic hydrotalcite (Example 15) of the present invention as measured by the $^{27}$Al-solid NMR.

Further, 0.6 g of stearic acid was added to the reacted slurry to treat the surface thereof for 2 hours, and the slurry was filtered through the Nutsche and was washed with hot water. The cake thereof was dried at 110° C., pulverized and was analyzed for its chemical composition to learn that there was obtained an HT-AHS (aluminosilicate anionic hydrotalcite),

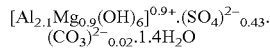
$[Al_{2.1}Mg_{0.9}(OH)_6]^{0.9+} \cdot (Na_{0.04}Al_{1.3}Si_{3.7}O_{10.4})^{2-}{}_{0.28} \cdot$
$(SO_4)^{2-}{}_{0.09} \cdot (CO_3)^{2-}{}_{0.08} \cdot 2.0H_2O$ of which the surface has been treated with the stearic acid. Table 1 shows the results of properties thereof that were measured, FIG. 4 shows an X-ray diffraction diagram thereof and FIG. 8 shows a diagram of $^{27}$Al-solid NMR measurement.

Example 16

Into a 1-L autoclave were introduced 39.01 g of aluminum hydroxide (Hydilite H-43M manufactured by Showa Denko Co.), 9.24 g of lithium carbonate, 2.38 g of basic magnesium carbonate (TT manufactured by Tokuyama Co.), 5.30 g of sodium carbonate and 780 g of water, and the reaction was conducted at 140° C. for 4 hours with stirring followed by filtration through the Nutsche and washing with hot water to obtain a cake thereof. Part of the cake was dried overnight at 110° C. to obtain a lithium magnesium aluminum complex hydroxide salt in which lithium has been partly isomorphously substituted by magnesium,

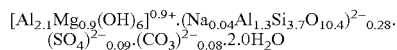
$[Al_2Li_{0.9}Mg_{0.1}(OH)_6]_2{}^{2.2+} \cdot (CO_3)^{2-}{}_{1.1} \cdot 2.5H_2O$ The cake in an amount of 10 g calculated as a dry product thereof was introduced into a 500-ml beaker and was dispersed again in 160 ml of water. To the slurry thereof, there were simultaneously added dropwise a mixed solution (A) of 4.89 g of aluminic acid soda (23.3% of Al$_2$O$_3$, 19.2% of Na$_2$O) and 20.1 g of water and a mixed solution (B) of 17.64 g of silicic acid soda (22.8% of SiO$_2$, 7.27% of Na$_2$O) and 7.4 g of water over a period of one hour to effect aging for one hour.

Further, 0.6 g of stearic acid was added to the reacted slurry to treat the surface thereof for 2 hours, and the slurry was filtered through the Nutsche and was washed with hot water. The cake thereof was dried at 110° C., pulverized and was analyzed for its chemical composition to learn that there was obtained G-LAHS (aluminosilicate anionic lithium magnesium aluminum complex hydroxide salt),

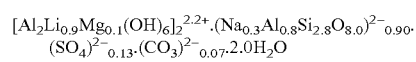
$[Al_2Li_{0.9}Mg_{0.1}(OH)_6]_2{}^{2.2+} \cdot (Na_{0.3}Al_{0.8}Si_{2.8}O_{8.0})^{2-}{}_{0.90} \cdot$
$(SO_4)^{2-}{}_{0.13} \cdot (CO_3)^{2-}{}_{0.07} \cdot 2.0H_2O$ of which the surface has been treated with the stearic acid.

Figure 9:
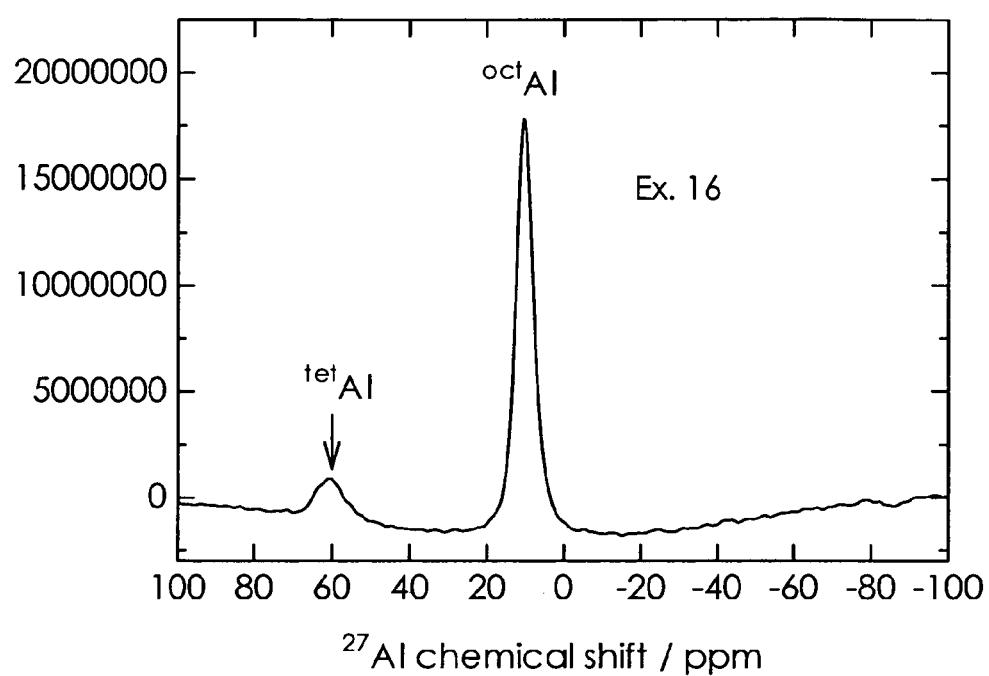
FIG. 9 is a chart of an aluminosilicate anionic LAHS in which Mg is isomorphously substituted (Example 16) of the present invention as measured by the $^{27}$Al-solid NMR.

Table 1 shows the results of properties thereof that were measured and FIG. 9 shows a diagram of $^{27}$Al-solid NMR measurement.

In the following Example, a three-layer-laminated film was prepared by using the sample of Example 13 as an intermediate layer, and the heat retaining property and the haze of the film were evaluated.

Example 17

By using an ethylene/vinyl acetate copolymer (EVA) and a linear low-density polyethylene (LLDPE), the following starting compounding materials for forming the outer layer, intermediate layer and inner layer were subjected to the inflation-forming at a working temperature of 160° C. to obtain a 150 μm-thick three-layer-laminated film of LLPDE (30 μm)/EVA (90 μm)/LLDPE (30 μm). Here, the outer layer, intermediate layer and inner layer stand for a surface on the outer side of a hothouse or hot tunnel, a surface on the inner side thereof and an intermediate layer between them when, for example, the film is used being stretched. The same also holds for the laminated films described below.

| Recipe of outer layer resin composition. | |
|---|---|
| LLDPE (MFR = 1.1) | 98.8% by weight |
| Ultraviolet-ray absorbing agent (Sumisobe 130 manufactured by Sumitomo Kagaku Co.) | 0.1% by weight |
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |
| Recipe of intermediate layer resin composition. | |
| LLDPE (metallocene type, MFR = 4) | 88.8% by weight |
| Heat retaining agent (Example 13) | 10.0% by weight |
| Ultraviolet-ray absorbing agent (Sumisobe 130 manufactured by Sumitomo Kagaku Co.) | 0.1% by weight |
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |
| Recipe of inner layer resin composition. | |
| LLDPE (MFR = 1.1) | 95.8% by weight |
| Anti-hazing agent (sorbitan monostearate) | 3.0% by weight |
| Ultraviolet-ray absorbing agent (Sumisobe 130 manufactured by Sumitomo Kagaku Co.) | 0.1% by weight |

-continued

| | |
|---|---|
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |

The obtained laminated film exhibited a haze value of 3.3% and a heat retaining ratio of 80.5%

Example 18

By using the LLDPE, the following starting compounding materials for forming the outer layer, intermediate layer and inner layer were subjected to the inflation-forming at a working temperature of 170° C. to obtain a 150 μm-thick three-layer-laminated film of LLPDE (30 μm)/LLDPE (90 μm)/LLDPE (30 μm). Thereafter, the Alumina Sol-100 manufactured by Nissan Kagaku Co. was applied as an antihazing agent onto the surface of the inner layer by using an acrylic resin binder.

Recipe of outer layer resin composition.

| | |
|---|---|
| LLDPE (MFR = 1.1) | 98.8% by weight |
| Ultraviolet-ray absorbing agent (Sumisobe 130 manufactured by Sumitomo Kagaku Co.) | 0.1% by weight |
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |

Recipe of intermediate layer resin composition.

| | |
|---|---|
| EVA (vinyl acetate content, 15%) | 88.8% by weight |
| Heat retaining agent (Example 13) | 10.0% by weight |
| Ultraviolet-ray absorbing agent (Sumisobe 130 manufactured by Sumitomo Kagaku Co.) | 0.1% by weight |
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |

Recipe of inner layer resin composition.

| | |
|---|---|
| LLDPE (MFR = 1.1) | 98.8% by weight |
| Ultraviolet-ray absorbing agent (Sumisobe 130 manufactured by Sumitomo Kagaku Co.) | 0.1% by weight |
| Antioxidant (butylhydroxytolene) | 0.3% by weight |
| Photo Stabilizer (Chinubin 622-LD manufactured by Chiba Geigy Co.) | 0.5% by weight |
| Lubricant (erucic amide) | 0.3% by weight |

The obtained laminated film exhibited a haze value of 3.2% and a heat retaining ratio of 69.7%.

TABLE 1

| | | Interlayer composition ratio | | | | | | | | | | |
|---|---|---|---|---|---|---|---|---|---|---|---|---|
| | type | p | q | r | z | p/q | q/r | a | b | c | a/A | m |
| Comp. Ex. 1 | $CO_3$ | | | | | | | | | 1.00 | 0.00 | 1.6 |
| Comp. Ex. 2 | exchanged with sulfuric acid | | | | | | | 0.00 | 0.95 | 0.05 | 0.00 | 1.4 |
| Comp. Ex. 3 | exchanged with aluminic acid | | | | | | | | | | | |
| Comp. Ex. 4 | exchanged with silicic acid | | | 3.7 | 8.4 | | 0.00 | 0.51 | 0.10 | 0.47 | 0.51 | 2.6 |
| Ex. 1 | exchanged with aluminosilicate | 0.7 | 2.2 | 2.8 | 10.3 | 0.34 | 0.78 | 0.82 | 0.10 | 0.08 | 0.82 | 3.9 |
| Ex. 2 | exchanged with aluminosilicate | 1.3 | 2.8 | 4.0 | 13.9 | 0.47 | 0.70 | 0.81 | 0.11 | 0.08 | 0.81 | 3.6 |
| Ex. 3 | exchanged with aluminosilicate | 1.9 | 3.0 | 5.2 | 16.9 | 0.63 | 0.57 | 0.79 | 0.12 | 0.09 | 0.79 | 3.4 |
| Ex. 4 | exchanged with aluminosilicate | 0.1 | 1.8 | 2.0 | 7.8 | 0.06 | 0.88 | 0.83 | 0.09 | 0.08 | 0.83 | 3.1 |
| Ex. 5 | exchanged with aluminosilicate | 0.6 | 1.8 | 2.8 | 9.6 | 0.36 | 0.63 | 0.84 | 0.09 | 0.07 | 0.84 | 2.6 |
| Ex. 6 | exchanged with aluminosilicate | 0.9 | 2.1 | 3.6 | 11.8 | 0.43 | 0.57 | 0.83 | 0.10 | 0.07 | 0.83 | 2.9 |
| Ex. 7 | exchanged with aluminosilicate | 0.3 | 1.4 | 2.5 | 8.3 | 0.20 | 0.57 | 0.84 | 0.10 | 0.06 | 0.84 | 2.6 |
| Ex. 8 | exchanged with aluminosilicate | 0.6 | 1.9 | 3.5 | 11.2 | 0.32 | 0.54 | 0.80 | 0.13 | 0.07 | 0.80 | 2.4 |
| Ex. 9 | exchanged with aluminosilicate | 0.6 | 1.1 | 4.4 | 11.8 | 0.56 | 0.26 | 0.75 | 0.18 | 0.07 | 0.75 | 2.6 |
| Ex. 10 | exchanged with aluminosilicate | 0.4 | 1.6 | 3.7 | 11.0 | 0.25 | 0.43 | 0.76 | 0.17 | 0.07 | 0.76 | 2.0 |
| Ex. 11 | exchanged with aluminosilicate | 0.1 | 1.5 | 2.6 | 8.5 | 0.07 | 0.58 | 0.80 | 0.14 | 0.06 | 0.80 | 1.6 |
| Ex. 12 | exchanged with aluminosilicate | 0.037 | 0.04 | 4.0 | 9.1 | 0.93 | 0.01 | 0.74 | 0.20 | 0.06 | 0.74 | 1.8 |
| Ex. 13 | exchanged with aluminosilicate | 0.1 | 0.6 | 3.6 | 9.2 | 0.21 | 0.18 | 0.73 | 0.21 | 0.06 | 0.73 | 1.4 |
| Ex. 14 | exchanged with aluminosilicate | 0.03 | 1.1 | 3.0 | 8.7 | 0.03 | 0.37 | 0.75 | 0.19 | 0.06 | 0.75 | 4.0 |
| Ex. 15 | exchanged with aluminosilicate | 0.04 | 1.3 | 3.7 | 10.4 | 0.03 | 0.35 | 0.28 | 0.09 | 0.08 | 0.63 | 2.0 |
| Ex. 16 | exchanged with | 0.3 | 0.8 | 2.8 | 8.0 | 0.39 | 0.27 | 0.90 | 0.13 | 0.07 | 0.82 | 2.0 |

TABLE 1-continued aluminosilicate

| | Evaluation of film | |
|---|---|---|
| | Degree of haze | Heat retaining ratio |
| Comp. Ex. 1 | 16.6 | 81.3 |
| Comp. Ex. 2 | 5.7 | 77.9 |
| Comp. Ex. 3 | | |
| Comp. Ex. 4 | 13.0 | 82.8 |
| Ex. 1 | 5.7 | 80.0 |
| Ex. 2 | 4.6 | 79.7 |
| Ex. 3 | 5.0 | 79.3 |
| Ex. 4 | 5.2 | 79.1 |
| Ex. 5 | 5.0 | 79.4 |
| Ex. 6 | 4.5 | 79.7 |
| Ex. 7 | 5.2 | 79.9 |
| Ex. 8 | 4.1 | 78.6 |
| Ex. 9 | 5.0 | 80.9 |
| Ex. 10 | 4.0 | 79.7 |
| Ex. 11 | 4.2 | 80.0 |
| Ex. 12 | 5.2 | 83.6 |
| Ex. 13 | 5.5 | 82.0 |
| Ex. 14 | 4.1 | 80.6 |
| Ex. 15 | 5.5 | 78.6 |
| Ex. 16 | 5.7 | 80.9 |

$[Al_2Li(OH)_6]_2{}^{2+} \cdot A^{2-} \cdot mH_2O$
$A^{2-}: (Na_pAl_qSi_rO_z)_a \cdot (SO_4)_b \cdot (CO_3)_c$
$[Mg_xAl_{3-x}(OH)_6]^{x+} \cdot A^{2-}{}_{x/2} \cdot mH_2O$
$A^{2-}: (Na_pAl_qSi_rO_z)_a \cdot (SO_4)_b \cdot (CO_3)_c$
$[Al_2Li_{(1-x)}Mg_x(OH)_6]_2{}^{2(1+x)+} \cdot A^{2-}{}_{1+x} \cdot mH_2O$
$A^{2-}: (Na_pAl_qSi_rO_z)_a \cdot (SO_4)_b \cdot (CO_3)_c$

The invention claimed is:

1. An aluminum complex hydroxide salt having Al oxide octahedral layers and a divalent anion among said octahedral layers, wherein an aluminosilicate anion expressed by the following general formula (1), $$[Na_pAl_qSi_rO_z]^{2-} \quad (1)$$

wherein p, q, r and z are positive numbers satisfying,
5≦z≦20,
z=(p/2)+(3q/2)+2r+1,
0<p/q<1,
0.01≦q/r≦-1 is, at least, contained as said divalent anion.

2. The aluminum complex hydroxide salt according to claim 1, wherein an Al atom in said aluminosilicate anion appears as a peak of Al of 4-coordination in a range of chemical shift of from +80 ppm to +50 ppm and an Al atom in the Al hydroxide octahedral layers appears as a peak of Al of 6-coordination in a range of chemical shift of from +20 ppm to −20 ppm as measured by $^{27}$Al-solid NMR.

3. The aluminum complex hydroxide salt according to claim 1, wherein said aluminosilicate anions are present at a ratio of not less than 25 mol % of the divalent anions among the layers.

4. The aluminum complex hydroxide salt according to claim 1, wherein $SO_4{}^{2-}$ and/or $CO_3{}^{2-}$ are also present as said divalent anions.

5. The aluminum complex hydroxide salt according to claim 1, wherein said Al hydroxide octahedral layers have a structure in which at least either one kind of atom selected from a Li atom and a Mg atom is introduced into a vacant site of a gibbsite type aluminum hydroxide, the aluminum complex hydroxide salt being expressed by the following general formula (2), $$[Al_2Li_{(1-x)}Mg_x(OH)_6]_2{}^{2(1+x)+} \cdot A^{2-}{}_{1+x} \cdot mH_2O \quad (2)$$

wherein $A^{2-}$ is the divalent anion among the layers,
x is a number satisfying 0≦x<1, and m is zero or a positive integer.

6. The aluminum complex hydroxide salt according to claim 5, being expressed by the following general formula (2a), $$[Al_2Li(OH)_6]_2{}^{2+} \cdot A^{2-} \cdot mH_2O \quad (2a)$$

wherein $A^{2-}$ is the divalent anion among the layers, and
m is zero or a positive integer.

7. The aluminum complex hydroxide salt according to claim 1, wherein said Al hydroxide octahedral layers have a hydrotalcite structure in which part of Mg in a brucite structure is isomorphously substituted by Al, the aluminum complex hydroxide salt is expressed by the following general formula (3), $$[Al_xMg_{3-x}(OH)_6]^x \cdot A^{2-}{}_{x/2} \cdot mH_2O \quad (3)$$

wherein $A^{2-}$ is the divalent anion among the layers,
x is a number satisfying 0.6≦x≦1.5, and m is zero or a positive integer.

8. A method of producing an aluminum complex hydroxide salt including following steps of;
reacting an aluminum hydroxide with a lithium carbonate in the presence of an aqueous medium to form a lithium aluminum complex hydroxide carbonate expressed by the following formula (4a), $$[Al_2Li(OH)_6]_2{}^{2+} \cdot (CO_3)^{2-} \cdot mH_2O \quad (4a)$$

wherein m is zero or a positive integer,
treating the lithium aluminum complex hydroxide carbonate with a mineral acid to substitute the carbonic acid radical by the mineral acid anion, and
reacting the obtained substituted product with silicic acid soda and aluminic acid soda to further substitute the mineral acid anion by an aluminosilicate anion expressed by the above formula (1), $$[Na_pAl_qSi_rO_z]^{2-} \tag{1}$$

wherein p, q, r and z are positive numbers satisfying,
$5 \leq z \leq 20$,
$z=(p/2)+(3q/2)+2r+1$,
$0<p/q<1$,
$0.01 \leq q/r \leq 1$.

9. The method of production according to claim 8, wherein the sulfuric acid is used as said mineral acid.

10. A method of producing an aluminum complex hydroxide salt including following steps of;
reacting an aluminum hydroxide, a lithium carbonate and a basic magnesium carbonate in the presence of an aqueous medium to form a lithium magnesium aluminum complex hydroxide carbonate expressed by the following formula (4b), $$[Al_2Li_{(1-x)}Mg_x(OH)_6]_2^{2(1+x)+}\cdot(CO_3)^{2-}{}_{1+x}\cdot mH_2O \tag{4b}$$

wherein x is a number satisfying $0<x<1$, and m is zero or a positive integer,
treating said lithium magnesium aluminum complex hydroxide carbonate with a mineral acid to substitute the carbonic acid radical by the mineral acid anion, and
reacting the obtained substituted product with silicic acid soda and aluminic acid soda to further substitute said mineral acid anion by an aluminosilicate anion expressed by the following formula (1), $$[Na_pAl_qSi_rO_z]^{2-} \tag{1}$$

wherein p, q, r and z are positive numbers satisfying,
$5 \leq z \leq 20$,
$z=(p/2)+(3q/2)+2r+1$,
$0<p/q<1$,
$0.01 \leq q/r \leq 1$.

11. The method of production according to claim 10, wherein a sulfuric acid is used as said mineral acid.

12. A method of producing an aluminum complex hydroxide salt including following steps of;
preparing a magnesium aluminum complex hydroxide sulfate expressed by the following formula (5), $$[Al_xMg_{3-x}(OH)_6]^x\cdot(SO_4)^{2-}{}_{x/2}\cdot mH_2O \tag{5}$$

wherein x is a number satisfying $0.6 \leq x \leq 1.5$, and m is zero or a positive integer,
reacting the magnesium aluminum complex hydroxide sulfate with silicic acid soda and aluminic acid soda, and substituting the sulfate anion in said formula (5) by the aluminosilicate anion expressed by the following formula (1), $$[Na_pAl_qSi_rO_z]^{2-} \tag{1}$$

wherein p, q, r and z are positive numbers satisfying,
$5 \leq z \leq 20$,
$z=(p/2)+(3q/2)+2r+1$,
$0<p/q<1$,
$0.01 \leq q/r \leq 1$.

13. A compounding agent for resins as described in claim 1.

* * * * *